INVENTOR.
William J. Mayer
BY Walter H. Lange, &
Thomas Turner, Jr.
ATTORNEY

United States Patent Office 3,212,834
Patented Oct. 19, 1965

3,212,834
ZIRCONIUM BORIDE BEARING
William J. Mayer and Walter H. Lange, St. Clair Shores, and Thomas Turner, Jr., Detroit, Mich., assignors to General Motors Corporation, Detroit, Mich., a corporation of Delaware
Filed Dec. 4, 1962, Ser. No. 242,221
12 Claims. (Cl. 308—241)

This invention relates to zirconium bearing members and to process of producing them. More particularly, this invention relates to zirconium rolling contact bearings having a thin surface layer of zirconium diboride.

The desirability of providing a bearing which will operate satisfactorily under unusual service conditions has been recognized for many years. Such conditions exist, for example, when the bearing cannot be lubricated or must be used in conjunction with abnormal lubricants, such as water and steam. Conventional ball bearing assemblies constructed from fairly hard steels are subject to oxidation, seizure of balls and races or other malfunctions if operated under conditions of inadequate lubrication. In addition, bearing failures also result from gum or varnish deposits on the balls and races.

It is therefore a principal object of the present invention to provide a bearing member which will resist corrosion, oxidation, galling and wear under such conditions, and which will also prevent buildup of corrosion products during operation. It is a further object of this invention to provide a simple and effective method by which bearings of this type can be produced.

These and other objects of the present invention are achieved with a dimensionally stable, wear-resistant bearing member characterized by outstanding wear and corrosion resistance and consisting essentially of a body of zirconium metal having a tightly adherent, thin layer of zirconium boride on its surface. Such a bearing is produced in accordance with our invention by forming a body of zirconium metal into the substantially finished shape of the particular bearing element, and heating this element while packed in boron powder to diffuse the boron into the surface of the zirconium to provide a thin but adherent layer of zirconium diboride on the load-bearing surface of the element.

Figure 1:
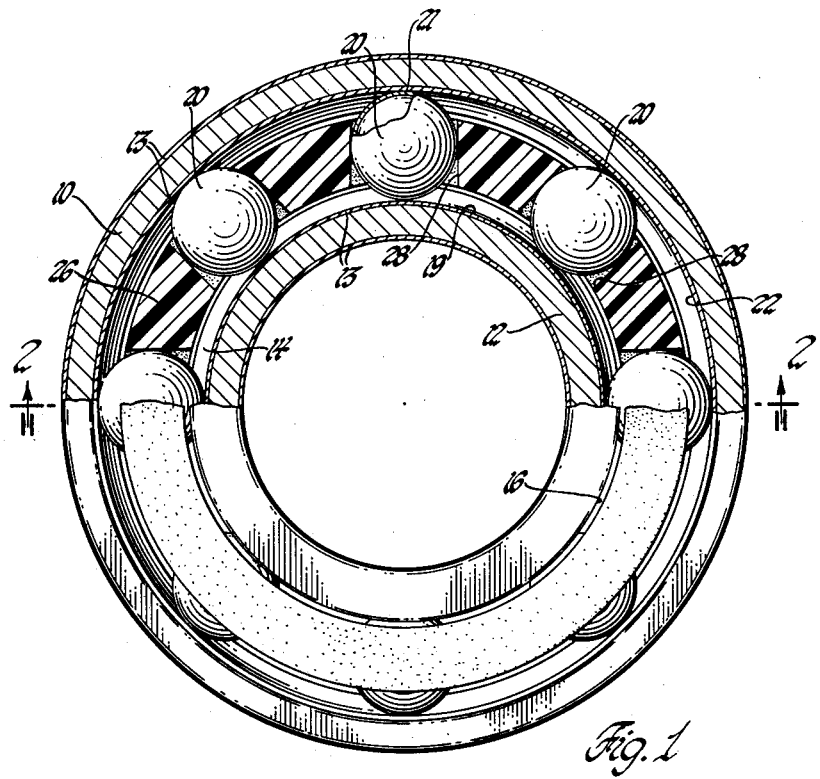
Figure 2:
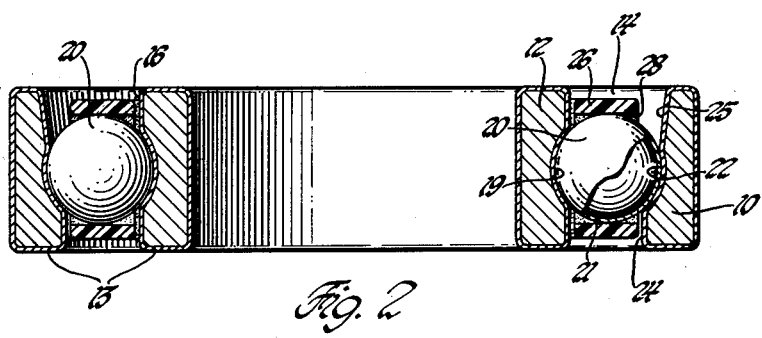

The invention will be described with reference to the accompanying drawing, in which:

FIGURE 1 is a side elevational view of a ball bearing assembly with parts broken away and in section; and FIGURE 2 is a sectional view of the ball bearing assembly along the line 2—2 of FIGURE 1.

The ball bearing structure shown in FIGURE 1 includes a generally cylindrical outer race 10 and a generally cylindrical inner race 12, each made of zirconium metal. As indicated above, the inner and outer races each has a thin but adherent layer 13 of zirconium diboride on their external surfaces. It will be appreciated, of course, that the thickness of this layer is greatly exaggerated in the drawing for the purpose of illustration. In general, it is desirable to provide a zironium diboride layer which is only a few mils in thickness, preferably in the range of 0.001 to 0.003 inch.

The inner race is coaxially aligned within the outer race and radially separated from it to form an annular space 14. A circumferential recess or groove 19 of arcuate cross section is provided in the outer cylindrical surface 16 of the inner race 12. Likewise, the outer race has similarly shaped annular recesses 22 in its inner cylindrical surface 24. A plurality of bearing balls 20 are seated snugly in recesses and are thus maintained within the annular space 14 between the outer and inner races. Of course, the bearing balls are free to revolve within the track formed by the grooves in the races. The inner cylindrical surface 24 of the outer race 10 is tapered at 25 to facilitate assembly of the elements.

The bearing balls also have a thin but adherent layer 21 of zirconium diboride on their external surfaces. The thickness of the zirconium diboride layer on the balls is approximately the same as the thickness of the zirconium diboride layer on the inner and outer races. As in the case of the races, the thickness of the layer is exaggerated in the drawing for the purpose of illustration.

An annular separator 26 is located within space 14. In most applications, such as gyro bearing assemblies, where very high temperature operating conditions are not encountered, the separator may be made of any appropriate plastic material, such as polymerized tetrafluoroethylene. In other applications, where very high temperature conditions are encountered, the separator may be made of zirconium or molybdenum metals. In some applications it may prove desirable to use a zirconium separator having a thin surface layer of zirconium diboride. The separator may also be made of graphite or other suitable heat-resistant meals.

A number of cylindrical openings 28 extend radially through the separator at equally spaced locations circumferentially. The separator thus maintains the bearing balls 20, which are located in these openings in fixed positions relative to one another. The balls are in sliding frictional contact with the surfaces of the separator defining the openings 28 but are free to rotate within the openings. Since the radial thickness of the separator is less than the diameter of the bearing balls, the separator is freely rotatable and supported by the balls within the space 14.

In accordance with this invention, each of the bearing balls and the inner and outer races is produced by forming a body of zirconium metal, which is preferably free of hafnium, into the finished shape of the particular bearing element. These shaped elements are then boronized to form a thin external surface layer of zirconium diboride on the elements. The boronizing step may be conducted in any suitable manner, such as heating the zirconium metal elements in the presence of boron powder to a temperature sufficient to cause the diffusion of the boron into the zirconium metal elements, resulting in the formation of a zirconium diboride surface layer on the elements. In order to prevent the formation of undesirable compounds, such as oxides, nitrides and hydrides of zirconium and boron, the boron should be diffused into the zirconium under either an inert atmosphere or a vacuum.

The zirconium diboride surface layer may be conveniently formed on the zirconium bearing elements by placing the elements in a crucible and packing boron powder over their external surfaces. The crucible may be made of tantalum or other suitable materials which are heat resistant. The crucible is suspended with molybdenum wire or other material in a Vycor tube or other suitable apparatus in which a vacuum or inert atmosphere may be maintained. Heating of the crucible with its contents may be accomplished by use of an induction furnace. The heat causes the boron to diffuse into the zirconium metal elements to form the zirconium diboride surface layer on the elements.

We have employed this process by packing the zirconium bearing elements in boron powder having a particle size of approximately 600 mesh and subjecting them to a temperature of about 1550° C. and an absolute pressure of 25 microns for one hour. A dense coating of zirconium diboride approximately 0.002 inch thick was formed on the external surfaces of the bearing elements. These elements were then cooled while still in the vacuum.

Of course, the processing conditions may be varied from those set forth above and still produce the desirable results. For example, as hereinbefore indicated, the boronizing may be carried out at atmospheric pressure using an inert atmosphere such as argon, helium, neon or other inert gas. These gases will not react with zirconium or boron to form undesirable compounds. Where sub-atmospheric conditions are employed, it is necessary to maintain the air concentration at a very low level to prevent oxidation and nitriding of the zirconium and boron. An absolute pressure in the range of about 20 to 30 microns has provided satisfactory results. The boronizing step may readily be carried out in a temperature range between approximately 1500° C. to 1800° C. At temperatures below 1500° C. the diffusion rate is very slow. Since zirconium metal melts at approximately 1900° C. and becomes very soft at temperatures slightly below the melting point, it is desirable not to exceed a temperature of 1800° C. in carrying out the boronizing step. The preferred temperature range for carrying out the boronizing step is between 1500° C. to 1600° C.

It has also been found that under the above conditions, the boron diffuses into the zirconium elements at a rate of approximately 0.001 inch each half-hour. It is sometimes desirable to remove the boronized elements from the boron powder and reheat the elements in a vacuum or inert atmosphere to a temperature of 1500° C. to 1800° C. to complete the diffusion and obtain a thicker layer of zirconium diboride. However, this step is generally not necessary.

During the initial heating stages the boron powder diffuses into the bearing member to form the dense surface layer of zirconium diboride without significantly increasing the overall dimensions of the individual elements. However, if the layer exceeds .003 inch in thickness, tolerance problems are encountered due to the very slight increase in the overall dimensions of the individual bearing elements. Naturally, if a thicker layer of zirconium diboride is desired, these problems may be compensated for by proper design of the bearing elements to be boronized. A layer of zirconium diboride approximately 0.001 to 0.003 inch in thickness has provided satisfactory results without appreciably affecting the tolerances of conventional sized bearing elements. The zirconium diboride has a density of approximately 6 grams per cubic centimeter and a Rockwell A hardness of about 87 to 89.

The thin surface layer of zirconium diboride thus produced on bearing elements provides the bearing assembly with good resistance to corrosion, galling, oxidation and wear under conditions wherein the bearing would otherwise be inadequately lubricated. Such a bearing also performs very satisfactorily under high temperature operating conditions. For instance, ball bearing assemblies of this type, made from hot rolled zirconium, have functioned satisfactorily for considerable periods of time at rotational speeds of 700 and 12,000 r.p.m.'s and at temperatures ranging from 165° F. to 1000° F. without any lubrication whatsoever. Thus bearing assemblies produced in the above manner are suitable for many different applications, particularly in gyro assemblies where lubrication of the bearing parts is often very difficult.

Although the present invention has been described in connection with certain specific examples, it is not to be limited thereby except as defined in the following claims.

We claim:

1. In a roller contact bearing assembly, a bearing element comprising a body of zirconium metal having a thin tightly adherent surface layer of zirconium diboride.

2. In a roller contact bearing assembly, a bearing element comprising a body of zirconium metal having a wear-resistant surface layer of zirconium diboride, said layer having a thickness not in excess of about .003 inch.

3. A machine having a roller contact bearing assembly operable under conditions in which said assembly cannot be lubricated by normal means, said assembly comprising a zirconium metal bearing element having improved wear and corrosion resistance under said conditions, said element being formed of a body of zirconium metal having a thin wear- and corrosion-resistant surface layer of zirconium diboride formed by boronizing a surface of said element.

4. A rolling contact bearing assembly comprising an outer generally cylindrical zirconium bearing race, an inner generally cylindrical zirconium bearing race coaxially aligned within and radially separated from said outer race, a plurality of zirconium rolling contact bearing elements in an annular space formed between said outer and inner races, said elements being in rolling contact with said outer and inner races, and a separator positioned within said space to maintain said elements at fixed positions relative to one another within said space, the surfaces of said elements in contact with said races being provided with a thin but tightly adherent layer of zirconium diboride.

5. A ball bearing assembly comprising an outer generally cylindrical zirconium bearing race, an inner generally cylindrical zirconium bearing race coaxially aligned within and radially separated from said outer race, a plurality of zirconium bearing balls positioned in an annular space formed between said outer and inner races, said balls being in rolling contact with said outer and inner races, and a separator positioned within said space to maintain said balls at fixed positions relative to one another within said space, said races and said balls having a tightly adherent surface layer of zirconium diboride of at least 0.001 inch in thickness.

6. A gyro having a ball bearing assembly, said assembly comprising an outer generally cylindrical zirconium bearing race, an inner generally cylindrical zirconium bearing race coaxially aligned within and radially separated from said outer race, a plurality of zirconium bearing balls positioned in an annular space formed between said outer and inner races, said balls being in rolling contact with said outer and inner races, and a separator positioned within said space to maintain said balls at fixed circumferential positions relative to one another within said space, said races and said balls having a tightly adherent surface layer of zirconium diboride on the contact surfaces thereof, said layer having a thickness of approximately .001 to .003 inch.

7. A method of improving the wear resistance of a zirconium bearing element, which comprises packing said element in boron powder, heating said element in an atmosphere which is essentially chemically inert with respect to zirconium and boron to a temperature and for a time sufficient to diffuse said boron into said element so that a thin but adherent surface layer of zirconium diboride is formed on said element, and subsequently cooling said element.

8. A method of improving the wear and corrosion resistance of a zirconium bearing element for use under unusual service conditions, said conditions being those in which the element cannot be lubricated or is lubricated by abnormal lubricants such as water or steam, said method comprising packing said element in boron powder, heating said element in an atmosphere which is essentially chemically inert with respect to zirconium and boron to a temperature and for a time sufficient to diffuse said boron into said element so that a thin but adherent surface layer of zirconium diboride is formed on said element, and subsequently cooling said element.

9. A method of improving the wear and oxidation resistance of a zirconium bearing assembly, said method comprising packing the parts of said assembly in boron powder, heating said parts to a temperature of approximately 1500° C. to 1800° C. in an inert atmosphere for a sufficient time to diffuse said boron into said parts to form a dense, adherent layer of zirconium diboride at the external surfaces of said parts, said layer having a thickness up to about 0.003 inch, and subsequently cooling said parts of said assembly in said inert atmosphere.

10. A method of improving the wear and oxidation resistance of a zirconium bearing element, said method comprising packing said element in boron powder, heating said element to a temperature between approximately 1500° C. to 1800° C. at an absolute pressure of less than about 30 microns, maintaining said element under said conditions of temperature and pressure for a sufficient period of time to diffuse said boron into said element and to form a dense, adherent surface layer of zirconium diboride on said element, said layer having a thickness of approximately 0.001 to 0.003 inch, and subsequently cooling said element at said pressure.

11. A method of producing a zirconium bearing element having improved galling and wear resistance, said method comprising heating said elment while in contact with a boron-containing substance in a nonoxidizing and non-nitriding atmosphere at a temperature and for a time sufficient to diffuse boron into said element to form a thin adherent surface layer of zirconium diboride on said element, and subsequently cooling said element in said atmosphere.

12. A method of producing a rolling contact zirconium metal bearing assembly having improved wear and oxidation resistance, said method comprising packing zirconium metal elements of said assembly in boron powder, heating said elements to a temperature between approximately 1500° C. and 1600° C. under an absolute pressure of less than about 30 microns, maintaining said elements under said conditions of temperature and pressure for a sufficient period of time to diffuse said boron into said elements to form a dense, adherent surface layer of zirconium diboride on said elements, said layer having a thickness of approximately 0.001 to 0.003 inch, cooling said elements at said absolute pressure, and subsequently assembling said elements.

References Cited by the Examiner
UNITED STATES PATENTS

| | | | |
|---|---|---|---|
| 2,534,929 | 12/50 | Schultz | 308—188 |
| 2,782,078 | 2/57 | Wright | 308—178 |
| 2,804,406 | 8/57 | Yntema | 148—6 |
| 2,854,353 | 9/58 | Schwope | 117—217 X |
| 2,949,390 | 8/60 | Feder | 148—6 |
| 3,001,837 | 8/61 | Lamson | 308—188 |
| 3,004,830 | 10/61 | Orne | 23—204 |
| 3,088,805 | 5/63 | Cotter | 106—57 |

FOREIGN PATENTS 870,170   6/61   Great Britain.

ROBERT C. RIORDON, *Primary Examiner.*
FRANK R. SUSKO, *Examiner.*

UNITED STATES PATENT OFFICE
CERTIFICATE OF CORRECTION

Patent No. 3,212,834            October 19, 1965

William J. Mayer et al.

It is hereby certified that error appears in the above numbered patent requiring correction and that the said Letters Patent should read as corrected below.

Column 1, line 59, for "zironium" read -- zirconium --; column 2, line 21, for "meals" read -- metals --; line 56, for "other material" read -- other suitable material --; column 6, line 18, for "8/61" read -- 9/61 --.

Signed and sealed this 28th day of June 1966.

(SEAL)
Attest:

ERNEST W. SWIDER
Attesting Officer

EDWARD J. BRENNER
Commissioner of Patents